United States Patent
Ego et al.

(10) Patent No.: US 12,256,144 B2
(45) Date of Patent: Mar. 18, 2025

(54) IMAGING APPARATUS, IMAGING METHOD, AND IMAGING PROGRAM THAT USES IMAGING RECORDING MODES FOR MOTION PICTURE IMAGING

(71) Applicant: FUJIFILM Corporation, Tokyo (JP)

(72) Inventors: Shunta Ego, Saitama (JP); Motoo Shigetoshi, Saitama (JP); Kazuya Okiyama, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 69 days.

(21) Appl. No.: 18/163,518

(22) Filed: Feb. 2, 2023

(65) Prior Publication Data
US 2023/0188841 A1   Jun. 15, 2023

Related U.S. Application Data

(63) Continuation of application No. PCT/JP2021/007367, filed on Feb. 26, 2021.

(30) Foreign Application Priority Data

Aug. 28, 2020   (JP) .................................. 2020-144982

(51) Int. Cl.
*H04N 23/667* (2023.01)
*G06T 3/40* (2024.01)
*G06T 7/20* (2017.01)

(52) U.S. Cl.
CPC ............. *H04N 23/667* (2023.01); *G06T 3/40* (2013.01); *G06T 7/20* (2013.01); *G06T 2207/10144* (2013.01); *G06T 2207/10148* (2013.01)

(58) Field of Classification Search
CPC .... H04N 23/667; H04N 23/675; H04N 23/60; G06T 3/40; G06T 7/20; G06T 2207/10144; G06T 2207/10148
See application file for complete search history.

(56) References Cited

U.S. PATENT DOCUMENTS

| | | | |
|---|---|---|---|
| 6,680,748 B1 * | 1/2004 | Monti | H04N 23/667 |
| | | | 348/E3.018 |
| 8,848,070 B2 * | 9/2014 | Morino | H04N 23/745 |
| | | | 348/226.1 |

(Continued)

FOREIGN PATENT DOCUMENTS

| | | |
|---|---|---|
| JP | S63-000574 U | 1/1988 |
| JP | 2005-072729 A | 3/2005 |

(Continued)

OTHER PUBLICATIONS

International Search Report issued in PCT/JP2021/007367; mailed Jun. 1, 2021.
Written Opinion of the International Searching Authority issued in PCT/JP2021/007367; mailed Jun. 1, 2021.

(Continued)

*Primary Examiner* — Chiawei Chen
(74) *Attorney, Agent, or Firm* — Studebaker Brackett PLLC

(57) ABSTRACT

An imaging apparatus includes: an imaging unit that is capable of performing imaging and recording; a first operating part; a second operating part; a mode setting unit; a storage unit that stores a still picture set value for imaging and recording of a still picture and a motion picture set value for imaging and recording of a motion picture; and a control unit as defined herein.

17 Claims, 5 Drawing Sheets

(56) References Cited

U.S. PATENT DOCUMENTS

| | | | |
|---|---|---|---|
| 9,077,900 B2* | 7/2015 | Baek | H04N 1/212 |
| 2007/0053565 A1* | 3/2007 | Aridome | H04N 5/772 |
| | | | 382/128 |
| 2011/0228128 A1* | 9/2011 | Ikeda | H04N 23/75 |
| | | | 348/222.1 |
| 2016/0344933 A1* | 11/2016 | Mukai | H04N 9/8042 |
| 2017/0085783 A1 | 3/2017 | Mukai et al. | |
| 2017/0085788 A1* | 3/2017 | Mukai | H04N 1/215 |
| 2017/0085802 A1 | 3/2017 | Mukai et al. | |
| 2017/0085804 A1* | 3/2017 | Mukai | H04N 23/631 |
| 2017/0208247 A1 | 7/2017 | Mukai et al. | |
| 2019/0289201 A1* | 9/2019 | Nishimura | H04N 13/239 |
| 2019/0335094 A1 | 10/2019 | Shoda | |
| 2021/0120188 A1 | 4/2021 | Iwase et al. | |

FOREIGN PATENT DOCUMENTS

| | | |
|---|---|---|
| JP | 2007-028369 A | 2/2007 |
| JP | 2016-032214 A | 3/2016 |
| JP | 2019-193131 A | 10/2019 |
| WO | 2019/187447 A1 | 10/2019 |

OTHER PUBLICATIONS

International Preliminary Report On Patentability issued in PCT/JP2021/007367; completed Mar. 7, 2022.
An Office Action; "Notice of Reasons for Refusal," mailed by the Japanese Patent Office on Apr. 23, 2024, which corresponds to Japanese Patent Application No. 2022-545280 and is related to U.S. Appl. No. 18/163,518; with English language translation.

* cited by examiner

FIG. 4

| OPERATION BUTTON | IMAGING MODE | STATE IN OPERATION | ACTION PERFORMED BY OPERATION |
|---|---|---|---|
| MOTION PICTURE SHORTCUT BUTTON | MOTION PICTURE MODE | BEFORE MOTION PICTURE IMAGING | START OF MOTION PICTURE IMAGING |
| | | DURING MOTION PICTURE IMAGING | END OF MOTION PICTURE IMAGING |
| | STILL PICTURE MODE | BEFORE MOTION PICTURE IMAGING | START OF MOTION PICTURE IMAGING |
| | | DURING MOTION PICTURE IMAGING | END OF MOTION PICTURE IMAGING |
| RELEASE BUTTON | MOTION PICTURE MODE | BEFORE MOTION PICTURE IMAGING | START OF MOTION PICTURE IMAGING |
| | | DURING MOTION PICTURE IMAGING | END OF MOTION PICTURE IMAGING |
| | STILL PICTURE MODE | BEFORE MOTION PICTURE IMAGING | STILL PICTURE IMAGING |
| | | DURING MOTION PICTURE IMAGING | END OF MOTION PICTURE IMAGING |

FIG. 6

Storage Medium 21

Table 61:

| STILL PICTURE SETTING ITEM | SET VALUE | TRANSFER TARGET (ITEM RELATING TO VISIBILITY) |
|---|---|---|
| STOP VALUE | ~~~ | O |
| SHUTTER SPEED | ~~~ | O |
| ISO SENSITIVITY | ~~~ | O |
| IMAGE PROCESSING | ~~~ | O |
| AF TRACKING SPEED | ~~~ | O |
| RESOLUTION | ~~~ | O |
| FOCUS MODE | ~~~ | |
| FLASH | ~~~ | |

Table 62:

| MOTION PICTURE SETTING ITEM | SET VALUE |
|---|---|
| STOP VALUE | ~~~ |
| SHUTTER SPEED | ~~~ |
| ISO SENSITIVITY | ~~~ |
| IMAGE PROCESSING | ~~~ |
| AF TRACKING SPEED | ~~~ |
| RESOLUTION | ~~~ |
| FOCUS MODE | ~~~ |
| TIME CODE | ~~~ |

IMAGING APPARATUS, IMAGING METHOD, AND IMAGING PROGRAM THAT USES IMAGING RECORDING MODES FOR MOTION PICTURE IMAGING

CROSS REFERENCE TO RELATED APPLICATION

This is a continuation of International Application No. PCT/JP2021/007367 filed on Feb. 26, 2021, and claims priority from Japanese Patent Application No. 2020-144982 filed on Aug. 28, 2020, the entire disclosures of which are incorporated herein by reference.

BACKGROUND OF THE INVENTION

1. Field of the Invention

The present invention relates to an imaging apparatus, an imaging method, and a computer readable medium storing an imaging program.

2. Description of the Related Art

There has been a rapid increase in demand for information devices having an imaging function, such as a digital still camera, a digital video camera, a mobile phone such as a smartphone, a tablet terminal, or an endoscope, in accordance with an increase in resolution of an imaging element, such as a complementary metal oxide semiconductor (CMOS) image sensor or a charge coupled device (CCD) image sensor. An electronic device having the above-mentioned imaging function is referred to as an imaging apparatus. JP2007-28369A, JP2005-72729A, and JP2019-193131A describe an imaging apparatus capable of performing imaging and recording of both a motion picture and a still picture.

SUMMARY OF THE INVENTION

An embodiment relating to the technique of the present disclosure provides an imaging apparatus, an imaging method, and a computer readable medium storing an imaging program capable of appropriately using imaging recording modes for motion picture imaging.

According to an embodiment relating to the technique of the present disclosure, there is provided an imaging apparatus including: an imaging unit that is capable of performing imaging and recording; a first operating part; a second operating part; a mode setting unit; a storage unit that stores a still picture set value for imaging and recording of a still picture and a motion picture set value for imaging and recording of a motion picture; and a control unit that causes the imaging unit to execute imaging and recording of the still picture by using the still picture set value in a case where the first operating part is operated and causes the imaging unit to execute imaging and recording of the motion picture by using at least a part of the still picture set value in a case where the second operating part is operated, in a state where the mode setting unit is set to a first mode, and causes the imaging unit to execute imaging and recording of the motion picture by using the motion picture set value in a case where the first operating part or the second operating part is operated, in a state where the mode setting unit is set to a second mode.

According to an embodiment relating to the technique of the present disclosure, there is provided another imaging apparatus including: an imaging unit that is capable of performing imaging and recording; a first operating part; a second operating part; a mode setting unit; a storage unit that stores a still picture set value for imaging and recording of a still picture and a motion picture set value for imaging and recording of a motion picture; and a control unit that causes the imaging unit to execute imaging and recording of the still picture by using the still picture set value in a case where the first operating part is operated and causes the imaging unit to execute imaging and recording of the motion picture by using at least a part of the still picture set value in which a motion picture for display is reflected in a case where the second operating part is operated, while outputting the motion picture for display by using at least a part of the still picture set value in a state where the mode setting unit is set to a first mode, and causes the imaging unit to execute imaging and recording of the motion picture by using the motion picture set value in a case where the first operating part or the second operating part is operated, while outputting a motion picture for display by using at least a part of the motion picture set value in a state where the mode setting unit is set to a second mode.

According to an embodiment relating to the technique of the present disclosure, there is provided an imaging method executed by a control unit of an imaging apparatus, which includes an imaging unit that is capable of performing imaging and recording, a first operating part, a second operating part, a mode setting unit, and a storage unit that stores a still picture set value for imaging and recording of a still picture and a motion picture set value for imaging and recording of a motion picture, the method comprising: causing the imaging unit to execute imaging and recording of the still picture by using the still picture set value in a case where the first operating part is operated and causing the imaging unit to execute imaging and recording of the motion picture by using at least a part of the still picture set value in a case where the second operating part is operated, in a state where the mode setting unit is set to a first mode; and causing the imaging unit to execute imaging and recording of the motion picture by using the motion picture set value in a case where the first operating part or the second operating part is operated, in a state where the mode setting unit is set to a second mode.

According to an embodiment relating to the technique of the present disclosure, there is provided another imaging method executed by a control unit of an imaging apparatus, which includes an imaging unit that is capable of performing imaging and recording, a first operating part, a second operating part, a mode setting unit, and a storage unit that stores a still picture set value for imaging and recording of a still picture and a motion picture set value for imaging and recording of a motion picture, the method comprising: causing the imaging unit to execute imaging and recording of the still picture by using the still picture set value in a case where the first operating part is operated and causing the imaging unit to execute imaging and recording of the motion picture by using at least a part of the still picture set value in which a motion picture for display is reflected in a case where the second operating part is operated, while outputting the motion picture for display by using at least a part of the still picture set value in a state where the mode setting unit is set to a first mode; and causing the imaging unit to execute imaging and recording of the motion picture by using the motion picture set value in a case where the first operating part or the second operating part is operated, while outputting a motion picture for display by using at least a part of the motion picture set value in a state where the mode setting unit is set to a second mode.

According to an embodiment relating to the technique of the present disclosure, there is provided an imaging program, which is stored in a computer readable medium, of causing a processor of an imaging apparatus, which includes an imaging unit that is capable of performing imaging and recording, a first operating part, a second operating part, a mode setting unit, and a storage unit that stores a still picture set value for imaging and recording of a still picture and a motion picture set value for imaging and recording of a motion picture, to execute processing of: causing the imaging unit to execute imaging and recording of the still picture by using the still picture set value in a case where the first operating part is operated and causing the imaging unit to execute imaging and recording of the motion picture by using at least a part of the still picture set value in a case where the second operating part is operated, in a state where the mode setting unit is set to a first mode; and causing the imaging unit to execute imaging and recording of the motion picture by using the motion picture set value in a case where the first operating part or the second operating part is operated, in a state where the mode setting unit is set to a second mode.

According to an embodiment relating to the technique of the present disclosure, there is provided another imaging program, which is stored in a computer readable medium, of causing a control unit of an imaging apparatus, which includes an imaging unit that is capable of performing imaging and recording, a first operating part, a second operating part, a mode setting unit, and a storage unit that stores a still picture set value for imaging and recording of a still picture and a motion picture set value for imaging and recording of a motion picture, to execute processing of: causing the imaging unit to execute imaging and recording of the still picture by using the still picture set value in a case where the first operating part is operated and causing the imaging unit to execute imaging and recording of the motion picture by using at least a part of the still picture set value in which a motion picture for display is reflected in a case where the second operating part is operated, while outputting the motion picture for display by using at least a part of the still picture set value in a state where the mode setting unit is set to a first mode; and causing the imaging unit to execute imaging and recording of the motion picture by using the motion picture set value in a case where the first operating part or the second operating part is operated, while outputting a motion picture for display by using at least a part of the motion picture set value in a state where the mode setting unit is set to a second mode.

According to the embodiments of the technique of the present disclosure, it is possible to provide an imaging apparatus, an imaging method, and a computer readable medium storing an imaging program capable of appropriately using the motion picture imaging in imaging recording modes for the motion picture imaging.

BRIEF DESCRIPTION OF THE DRAWINGS

FIG. 4 is a diagram showing an example of assignment of an action to each operating part of the digital camera 100.

FIG. 6 is a diagram showing an example of settings of the digital camera 100.

DESCRIPTION OF THE PREFERRED EMBODIMENTS

Hereinafter, embodiments of the present invention will be described, with reference to the drawings.

Figure 1:
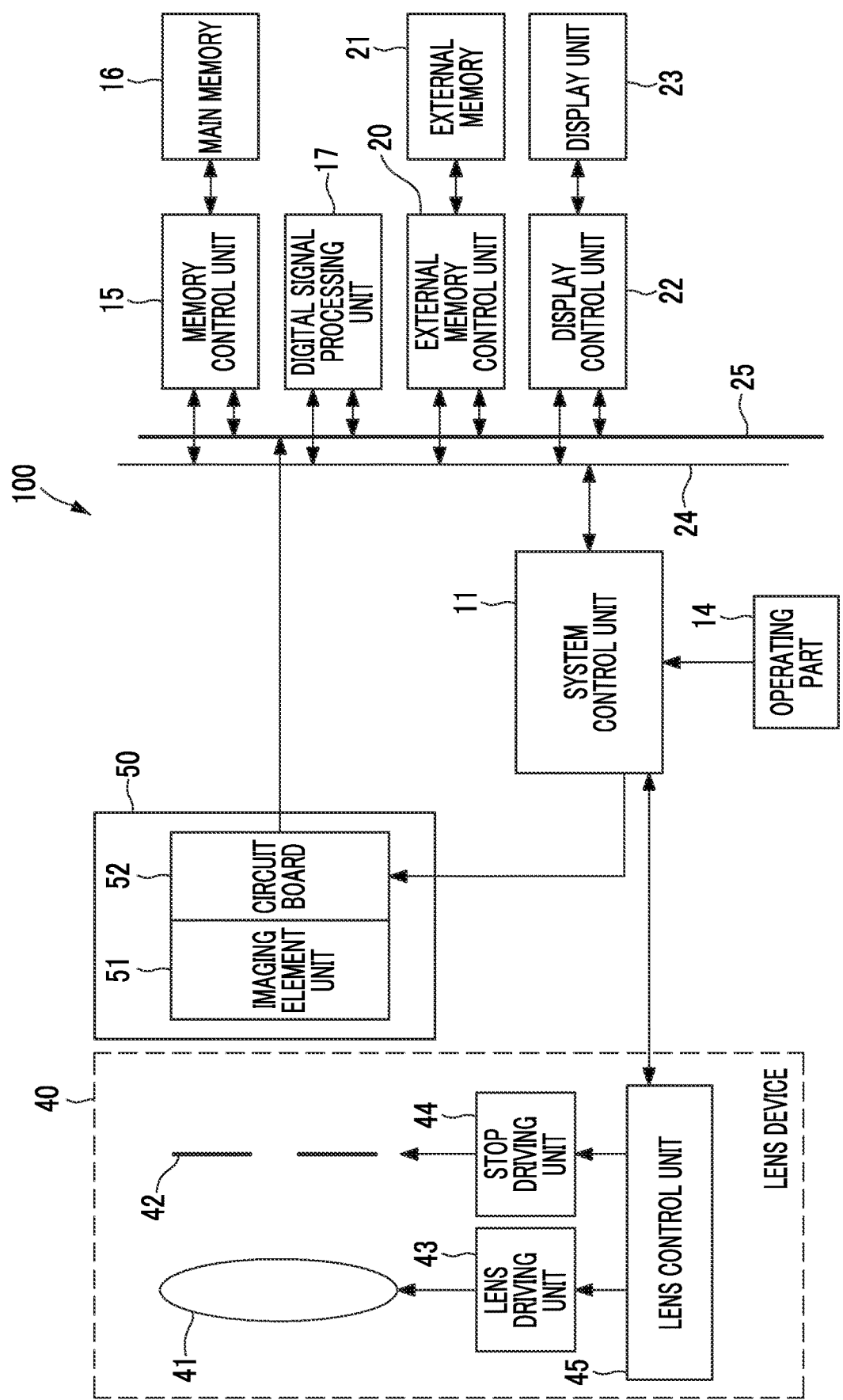
FIG. 1 is a diagram showing an example of a configuration of a digital camera 100 as an embodiment of an imaging apparatus according to the present invention.

Configuration of Digital Camera 100 as One Embodiment of Imaging Apparatus of Present Invention FIG. 1 is a diagram showing an example of a configuration of a digital camera 100 as an embodiment of an imaging apparatus according to the present invention.

The digital camera 100 shown in FIG. 1 comprises a lens device 40 including an imaging lens 41, a stop 42, a lens driving unit 43, a stop driving unit 44, and a lens control unit 45.

The lens device 40 may be attachable to or detachable from a body of the digital camera 100, or may be integrated with the body of the digital camera 100.

The imaging lens 41 includes a focus lens, a zoom lens, or the like that is movable in the optical axis direction. The imaging optical system is composed of the imaging lens 41 and the stop 42.

The lens control unit 45 of the lens device 40 is configured to be able to communicate with a system control unit 11 of the digital camera 100 by wire or wirelessly.

The lens control unit 45 drives a focus lens included in the imaging lens 41 through the lens driving unit 43 to change the position of the principal point of the focus lens or controls the aperture amount of the stop 42 through the stop driving unit 44, in accordance with a command issued from the system control unit 11.

The digital camera 100 further comprises an imaging unit 50 that is for imaging a subject through an imaging optical system, a system control unit 11, and an operating part 14. The system control unit 11 is an example of the control unit and the mode setting unit according to the embodiment of the present invention, and can be set to the still picture mode and the motion picture mode as the imaging recording modes. The still picture mode is an example of a first mode according to the embodiment of the present invention. The motion picture mode is an example of a second mode according to the embodiment of the present invention.

The imaging unit 50 comprises an imaging element unit 51 such as a CMOS image sensor or a CCD image sensor, and a circuit board 52. The imaging element unit 51 is fixed to the circuit board 52 through a conductive member.

The imaging element unit 51 has a light-receiving surface in which a plurality of pixels are disposed in a two-dimensional manner, and converts a subject image, which is formed on the light-receiving surface by the imaging optical system, into an electric signal (pixel signal) and outputs the electric signal by using the plurality of pixels.

The system control unit 11 drives the imaging element unit 51 to output a subject image captured through the imaging optical system of the lens device 40 as a captured image signal.

A command signal issued from a user is input to the system control unit 11 through the operating part 14.

The system control unit 11 integrally controls the entire digital camera 100, and the hardware structure is various processors that execute programs to perform processing.

The various processors include: a central processing unit (CPU) as a general-purpose processor which performs various processing units by executing programs; a programmable logic device (PLD) as a processor capable of changing a circuit configuration after manufacturing a field programmable gate array (FPGA); a dedicated electrical circuit as a processor, which has a circuit configuration specifically designed to execute specific processing, such as an application specific integrated circuit (ASIC); and the like.

More specifically, a structure of these various processors is an electric circuit in which circuit elements such as semiconductor elements are combined.

The system control unit 11 may be configured as one of various processors, or may be configured as a combination of two or more of the same or different kinds of processors (for example, a combination of a plurality of FPGAs or a combination of a CPU and an FPGA).

Further, the electrical control system of the digital camera 100 comprises: a main memory 16 composed of a random access memory (RAM); a memory control unit 15 that controls data storage in the main memory 16 and data reading from the main memory 16; a digital signal processing unit 17 that performs digital signal processing on the captured image signal which is output from the imaging unit 50 to generate captured image data according to various formats such as a joint photographic experts group (JPEG) format; an external memory control unit 20 that controls data storage in an external memory 21 and data reading from the external memory 21; a display unit 23 that is composed of an organic electroluminescence (EL) display, a liquid crystal display, and the like; and a display control unit 22 that controls display of the display unit 23. The external memory 21 is an example of a storage unit according to the embodiment of the present invention. The storage unit stores a still picture set value for imaging and recording of a still picture and a motion picture set value for imaging and recording of a motion picture. The display unit 23 is an example of a display unit that displays a motion picture for display.

The system control unit 11, the memory control unit 15, the digital signal processing unit 17, the external memory control unit 20, and the display control unit 22 are connected through a system bus 24, and communicate control signals from the respective control units. Further, the imaging unit 50 is connected to the memory control unit 15, the digital signal processing unit 17, the external memory control unit 20, and the display control unit 22 by a data bus 25, and transmits data such as the image signals of the captured image signals issued from the imaging unit and the image signals between the control units. The system control unit 11, the memory control unit 15, the digital signal processing unit 17, the external memory control unit 20, and the display control unit 22 are described separately herein, but may be implemented by one processor or a multi-processor system.

The imaging and recording are, for example, imaging performed by the lens device 40 and the imaging unit 50, and recording of the recorded image, which is obtained by the imaging, in the external memory 21. The lens device 40, the imaging unit 50, and the external memory 21 are examples of imaging units capable of performing imaging and recording. As the external memory 21, it is possible to use, for example, a commercially available recording medium such as a memory card or a hard disk that is attachable to and detachable from the digital camera 100.

The system control unit 11 is able to control light emission of a flash light emitting device not shown in the drawing, and uses the light as auxiliary light during imaging. The flash light emission may be built in the digital camera 100 or may be a removable external type.

Exterior Configuration of Digital Camera 100

Figure 2:
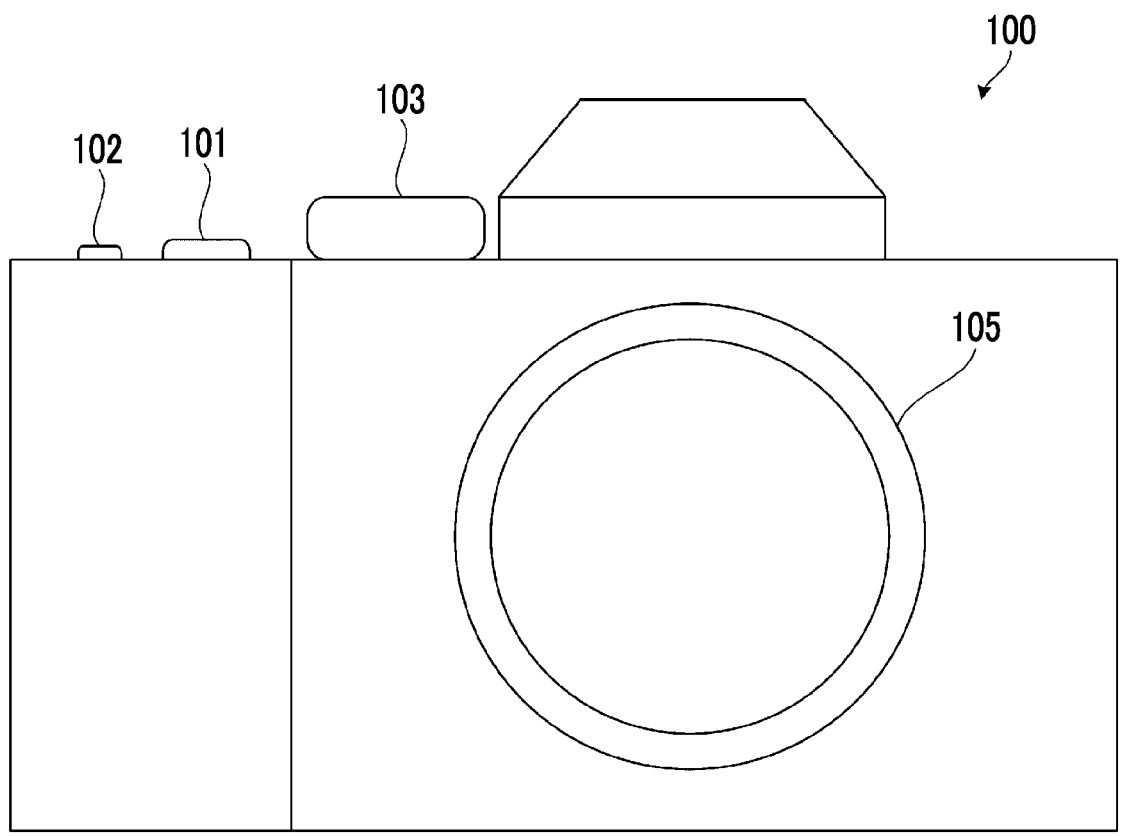
FIG. 2 is a front view showing an example of an external configuration of the digital camera 100.
Figure 3:
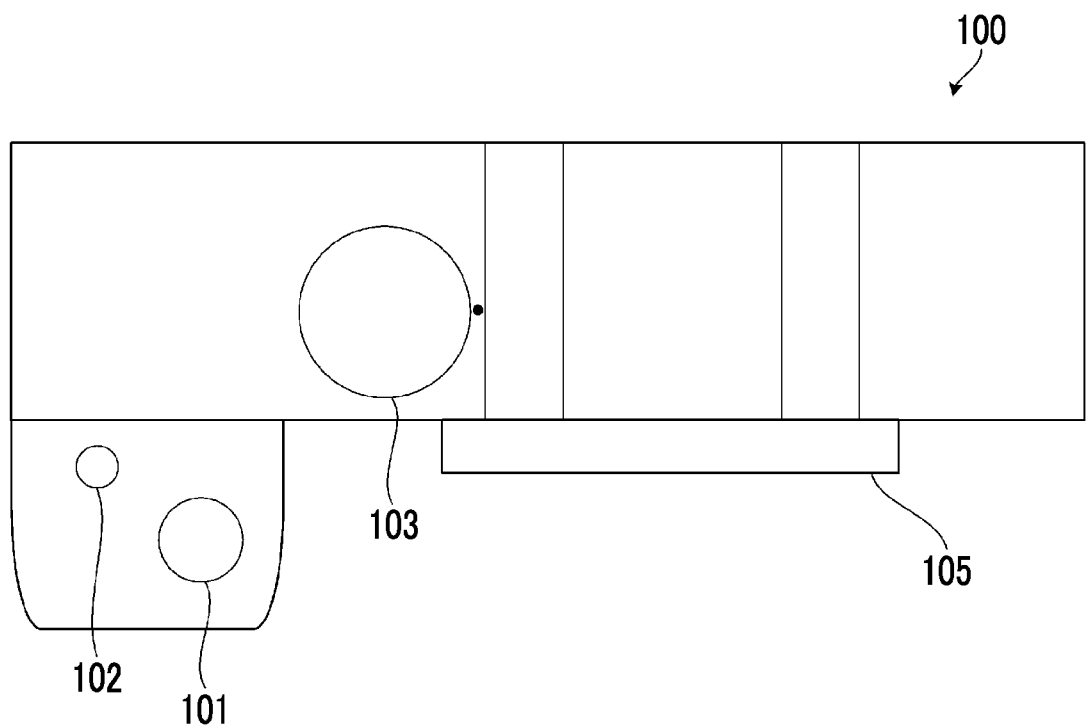
FIG. 3 is a top view showing an example of an external configuration of the digital camera 100.

FIG. 2 is a front view showing an example of an external configuration of the digital camera 100. FIG. 3 is a top view showing an example of an external configuration of the digital camera 100.

The digital camera 100 shown in FIG. 2 is an interchangeable lens camera having a lens mount 105 which the lens device 40 shown in FIG. 1 is attachable to and detachable from.

The digital camera 100 comprises a release button 101, a motion picture shortcut button 102, and a mode dial 103 as the operating part 14 shown in FIG. 1. The release button 101 is an example of a first operating part according to the embodiment of the present invention. The motion picture shortcut button 102 is an example of a second operating part according to the embodiment of the present invention. The mode dial 103 is an example of a third operating part according to the embodiment of the present invention.

In the example shown in FIG. 2 and FIG. 3, the release button 101, the motion picture shortcut button 102, and the mode dial 103 are provided on an upper portion of a part of the digital camera 100 which is held by a user with a right hand. The release button 101 is a press button which is mainly for issuing an instruction of imaging of a still picture. The motion picture shortcut button 102 is a press button which is mainly for issuing an instruction of imaging of the motion picture. The mode dial 103 is a dial which is for instructing the system control unit 11 to switch between the still picture mode and the motion picture mode.

Each of the still picture mode and the motion picture mode may include a plurality of modes. For example, the still picture mode may include a fully automatic mode in which still picture imaging is performed using a shutter speed and an F number which are automatically set, a shutter speed priority mode in which the still picture imaging is performed using a shutter speed which is set by a user and an F number which is automatically set, a aperture priority mode in which the still picture imaging is performed using the F number which is set by the user and the shutter speed which is automatically set. In such a case, the mode dial 103 switches between the plurality of still picture modes and the plurality of motion picture modes.

Although not shown in the drawing, the digital camera 100 is further provided with an operation interface (for example, a button or a dial) for the user to set a still picture set value or a motion picture set value stored in the external memory 21 as the operating part 14.

Assignment of Action to Each Operating Part of Digital Camera 100

FIG. 4 is a diagram showing an example of assignment of actions to the respective operating parts of the digital camera 100. The digital camera 100 acts in accordance with, for example, an action table 46 shown in FIG. 4. The action table 46 shows "action performed by operation" for each combination of "operation button", "imaging recording mode", and "state at the time of operation".

The "operation button" of the action table 46 is a button to be operated, and is a release button 101 or a motion picture shortcut button 102.

The "imaging recording mode" of the action table 46 is an imaging recording mode of the system control unit 11 in a case where an operation is performed, and is a still picture mode or a motion picture mode.

The "state at the time of operation" of the action table 46 is a state of the digital camera 100 in a case where the operation is performed, and is "before the motion picture imaging" or "during the motion picture imaging". The "before the motion picture imaging" is a state of waiting for an instruction in which imaging and recording of the motion picture are not performed. For example, the "before the motion picture imaging" is a state where imaging and recording are not performed in a state where power of the digital camera 100 is turned on. Further, the "before the motion picture imaging" may include a state where power of the digital camera 100 is turned off. The "during the motion picture imaging" is a state where imaging and recording of the motion picture are being performed.

The "action performed by operation" of the action table 46 is an action of the digital camera 100 in a case where the operation is performed, and is any one of "start of motion picture imaging", "end of motion picture imaging", or "still picture imaging". The "start of motion picture imaging" is a start of imaging and recording of motion picture. The "end of motion picture capture" is an end of the imaging and recording of the motion picture. The "still picture imaging" is imaging and recording of a still picture.

For example, in a case where the motion picture shortcut button 102 is pressed in a state where the system control unit 11 is in the motion picture mode or the still picture mode and the motion picture is not imaged and recorded (before the motion picture imaging), the system control unit 11 starts the imaging and recording of the motion picture.

Further, in a case where the release button 101 is pressed in a state where the system control unit 11 is in the motion picture mode and the motion picture is not imaged and recorded (before the motion picture imaging), the system control unit 11 starts the imaging and recording of the motion picture.

Further, in a case where the release button 101 is pressed in a state where the system control unit 11 is in the still picture mode and the motion picture is not imaged and recorded (before the motion picture imaging), the system control unit 11 executes the imaging and recording of the still picture.

Further, regardless of the imaging recording mode of the system control unit 11, in a case where the release button 101 or the motion picture shortcut button 102 is pressed in a state where the motion picture is imaged and recorded (during the motion picture imaging), the system control unit 11 ends the imaging and recording of the motion picture.

Processing Performed by Digital Camera 100

Figure 5:
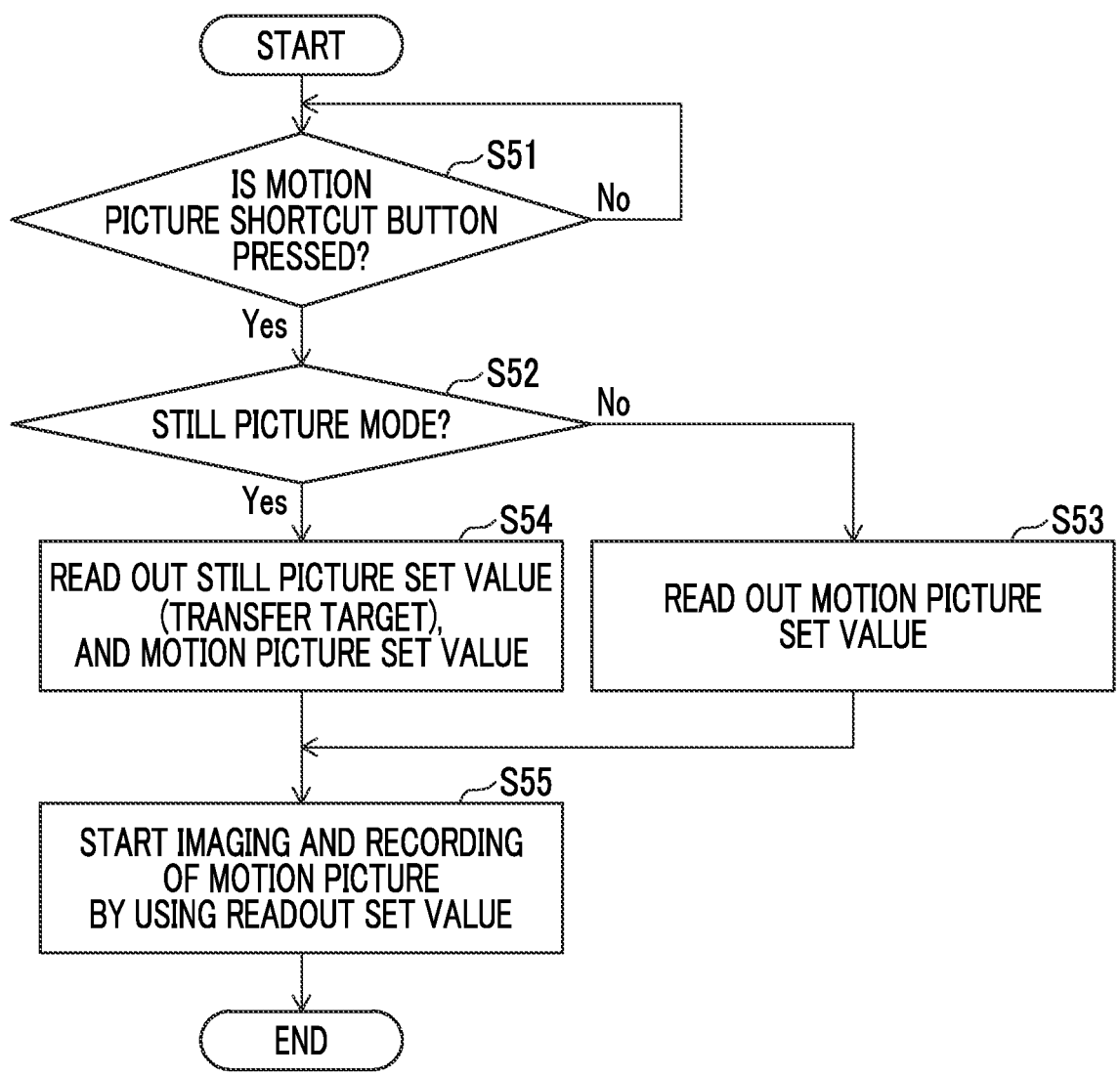
FIG. 5 is a flowchart showing an example of processing performed by the digital camera 100.

FIG. 5 is a flowchart showing an example of processing performed by the digital camera 100. Regarding the pressing of the motion picture shortcut button 102 in an imaging standby state where the digital camera 100 does not perform imaging and recording, that is, in the state "before the motion picture imaging" shown in FIG. 4, the system control unit 11 of the digital camera 100 shows, for example, the processing shown in FIG. 5.

First, the system control unit 11 determines whether or not the motion picture shortcut button 102 is pressed (step S51), and waits until the motion picture shortcut button 102 is pressed (step S51: a loop of No). In a case where the motion picture shortcut button 102 is pressed (Step S51: Yes), the system control unit 11 determines whether or not the current imaging recording mode is the still picture mode (Step S52).

In step S52, in a case where the still picture mode is not set (step S52: No), that is, in the motion picture mode, the system control unit 11 reads out the motion picture set value which is stored in the external memory 21 (step S53), and the processing proceeds to step S55. In a case where the still picture mode is set (step S52: Yes), the system control unit 11 reads out the motion picture set value which is stored in the external memory 21 and a set value to be a transfer target among the still picture set values which are stored in the external memory 21 (step S54).

Next, the system control unit 11 causes the lens device 40, the imaging unit 50, and the external memory 21 to start imaging and recording of the motion picture by using the set value which is read out in step S53 or step S54 (step S55), and ends a series of processing steps in a case where the motion picture shortcut button 102 is pressed.

That is, in a case where the motion picture shortcut button 102 is pressed in the still picture mode, the system control unit 11 reads out a set value to be a transfer target among the still picture set values which are stored in the external memory 21 as a set value which is used for the motion picture imaging. A specific example of the still picture set value to be a transfer target will be described later (refer to, for example, FIG. 6).

Each Setting of Digital Camera 100

FIG. 6 is a diagram showing an example of settings of the digital camera 100. For example, as shown in FIG. 6, the external memory 21 stores still picture setting information 61 and motion picture setting information 62. The still picture setting information 61 is information including the still picture set values, and the motion picture setting information 62 is information including the motion picture set values.

For example, each of the still picture setting information 61 and the motion picture setting information 62 includes set values of an "F number", a "shutter speed", an "ISO sensitivity", an "image processing", an "AF tracking speed", a "resolution", and a "focus mode". Further, the still picture setting information 61 includes a set value of a "flash". Further, the motion picture setting information 62 includes a set value of a "time code". Each of these set values is set in accordance with a user operation and is stored in the external memory 21.

The "transfer target" of the still picture setting information 61 indicates an item, which is transferred for the imaging and recording of the motion picture in a case where the motion picture shortcut button 102 is pressed in the still picture mode, among the items of the still picture set values. The item of the still picture set value which is set as the "transfer target" is an item relating to visibility of the subject indicated by the recorded image stored by the imaging and recording, that is, appearance of the recorded image during reproduction, among the items of the still picture set values. Further, the still picture set value which is set as the "transfer target" is a set value of an item included in either the still picture set value or the motion picture set value.

Specifically, among the items of the still picture set values shown in the still picture setting information 61, the "F number", the "shutter speed", the "ISO sensitivity", the "image processing", the "AF tracking speed", and the "resolution" are set as the "transfer targets". On the other hand, among the items of the still picture set values shown in the still picture setting information 61, the "focus mode" and the "flash" are not set as the "transfer target".

The "F number", the "shutter speed", and the "ISO sensitivity" are specific examples of items relating to exposure (luminance) of imaging performed by the imaging unit 50. The "image processing" is a specific example of items relating to the image processing of the recorded image, and includes image processing on images, which are obtained through imaging, such as white balance, dynamic range, tone curve, color, sharpness, and noise reduction, and a scene mode that serves as a reference for automatically setting the image processing, and the like.

The "AF tracking speed" is an example of an item relating to the movement of the subject in imaging, and is a tracking speed of autofocus (distance measurement point or focus) with respect to the movement of the subject. The tracking speed of autofocus is, for example, a movement of the distance measurement point or a tracking speed of focus. The other examples of the item relating to the movement of the subject in the imaging may include, for example, a tracking speed of the automatic exposure, a tracking speed of the automatic white balance, and the like. The "resolution" is a specific example of an item relating to the resolution of the recorded image, and is represented by a pixel size, a crop range, or the like.

The "focus mode" is a focusing method, and examples thereof include single autofocus (AF-S), continuous autofocus (AF-C), and manual focus (MF). The "focus mode" is not set as the "transfer target" since the recorded image obtained through imaging has a small influence on the visibility (appearance) of the subject.

The "flash" of the still picture setting information 61 is an example of the setting peculiar to the still picture, and is a setting item relating to the flash imaging. Since the "flash" is included in the still picture setting information 61 and not included in the motion picture setting information 62, the "flash" is not set as the "transfer target".

The "time code" of the motion picture setting information 62 is an example of a setting peculiar to the motion picture, which is included in the motion picture setting information 62 and is not included in the still picture setting information 61, and is a setting item relating to the time code stored together with the motion picture.

For example, in the still picture mode, in a case where the release button 101 is pressed, the system control unit 11 executes imaging and recording of the still picture by using the set value of the still picture setting information 61. Further, in a case where the release button 101 or the motion picture shortcut button 102 is pressed in the motion picture mode, the system control unit 11 executes the imaging and recording of the motion picture by using the set value of the motion picture setting information 62.

Further, in a case where the motion picture shortcut button 102 is pressed in the still picture mode, the system control unit 11 executes the imaging and recording of the motion picture by using the set values which are set as the "transfer target" in the still picture setting information 61 and the set values, which are not set as the "transfer target" in the still picture setting information 61, in the still picture setting information 61.

For example, in such a case, the system control unit 11 performs imaging and recording of the motion picture by using the set values of the "F number", the "shutter speed", the "ISO sensitivity", the "image processing", the "AF tracking speed", and the "resolution" of the still picture setting information 61 and the set values of the "focus mode" and the "time code" of the motion picture setting information 62.

The still picture setting information 61 and the motion picture setting information 62 are not limited to the example shown in FIG. 6. For example, a frame rate or the like may be set as a setting item that is included in the still picture setting information 61 but not included in the motion picture setting information 62. Further, a luminance level, an aspect ratio, an ISO sensitivity upper limit, and the like may be set as the setting items included in the still picture setting information 61 and the motion picture setting information 62.

As described above, in a case where the motion picture shortcut button 102 is operated in the still picture mode, the system control unit 11 performs imaging and recording of the motion picture by using the set value of the item relating to the visibility among the still picture set values and at least a part of the motion picture set values. Thereby, in a case in which the imaging and recording of the motion picture are performed in the still picture mode, it is possible to transfer setting which is set by a user for the imaging and recording of the still picture and it is possible to perform the imaging and recording of the motion picture.

Further, in a case where the motion picture shortcut button 102 is pressed in the still picture mode to capture a motion picture, the system control unit 11 performs imaging and recording of the motion picture by using the set value of the motion picture setting information 62 in at least a part (for example, the focus mode) of the still picture set values of the items other than the items relating to the visibility.

Further, in a state where the imaging and recording of the motion picture are performed in the still picture mode, in a case where there is a setting item for which it is better to use a constant set value regardless of the set value of the motion picture setting information 62 which is set by a user, a constant set value thereof may be stored in the external memory 21, separately from the still picture setting information 61 and the motion picture setting information 62. In such a case, in a case where the motion picture shortcut button 102 is pressed in the still picture mode and imaging and recording of the motion picture is performed, the system control unit 11 performs imaging and recording of the motion picture by using the constant set value (for example, AF-C) stored in the external memory 21 in at least a part (for example, focus mode) of the still picture set values of the items other than the items relating to the visibility.

As described above, in a case where the release button 101 is operated in a state where the still picture mode is set, the digital camera 100 executes the imaging and recording of the still picture. Further, in a case where the motion picture shortcut button 102 is operated in a state where the still picture mode is set, the digital camera 100 executes the imaging and recording of the motion picture. Further, in a case where the release button 101 or the motion picture shortcut button 102 is operated in a state where the motion picture mode is set, the digital camera 100 executes the imaging and recording of the motion picture.

Thereby, in a case where it is desired to perform motion picture imaging in the still picture mode, motion picture imaging is executed by operating the motion picture shortcut button 102 even in a case where switching to the motion picture mode is not performed. Therefore, the number of steps can be reduced.

Further, the digital camera 100 uses the still picture set value for still picture imaging in a case where the release button 101 is operated in a state where the still picture mode is set, and uses the motion picture set value for the motion picture imaging in a case where the release button 101 or the motion picture shortcut button 102 is operated in a state where the motion picture mode is set. Further, the digital camera 100 uses at least a part of the still picture set value for the motion picture imaging in a case where the motion picture shortcut button 102 is operated in a state where the still picture mode is set.

Accordingly, in the digital camera 100 having the still picture mode and the motion picture mode, in a case where the motion picture imaging is performed in the still picture mode, it is possible to perform the motion picture imaging by transferring the still picture set value which is set by the user for the imaging and recording of the still picture. Therefore, it is possible to perform the motion picture imaging while maintaining the appearance of the imaging and recording of the still picture. Further, in a case where the motion picture imaging is performed in the motion picture mode, the motion picture can be imaged using the motion picture set value which is set by the user for the motion picture imaging. Therefore, a user is able to appropriately use the motion picture in the still picture mode and the motion picture in the motion picture mode in accordance with the intention of the motion picture imaging.

For example, it is assumed that a user wants to perform motion picture imaging of the sunset in a situation where imaging and recording of the still picture of the sunset are performed by setting the digital camera 100 to the still picture mode and setting the scene mode included in the "image processing" of the still picture setting information 61 shown in FIG. 6 to the "sunset mode". In such a case, the user is able to perform the motion picture imaging continuously in the "sunset mode" by pressing the motion picture shortcut button 102 without switching the imaging recording mode of the digital camera 100 from the still picture mode to the motion picture mode. Thereby, it is possible to suppress a large change in the appearance of the recorded image in a case where the motion picture imaging is performed from the still picture mode.

On the other hand, it is assumed that the user wants to perform the motion picture imaging using the motion picture set value which is created in a case where the digital camera 100 is set to the motion picture mode in the same situation. In such a case, the user switches the imaging recording mode of the digital camera 100 from the still picture mode to the motion picture mode by the mode dial 103, and presses the release button 101 or the motion picture shortcut button 102. Thereby, it is possible to perform motion picture imaging using the motion picture set value created for the motion picture.

Display of Motion Picture for Display

The system control unit 11 may display a motion picture for display on the display unit 23 in a case where the imaging and recording of the still picture or the motion picture are not performed. The motion picture for display shows, for example, an image generated by the imaging unit 50 constantly performing imaging in real time. Further, the motion picture for display may be displayed during the imaging and recording of the motion picture.

Further, the system control unit 11 applies the still picture set value and the motion picture set value which are used for the imaging and recording in a case of generating the motion picture for display. For example, in a case where the still picture mode is set, the system control unit 11 causes the display unit 23 to display the motion picture for display in which at least a part of the still picture set values is reflected. Further, in a case where the motion picture mode is set, the system control unit 11 causes the display unit 23 to display a motion picture for display in which at least a part of the motion picture set value is reflected.

Further, in a case where the motion picture shortcut button 102 is operated in a state where the still picture mode is set, the system control unit 11 causes the lens device 40, the imaging unit 50, and the external memory 21 to execute the imaging and recording of the motion picture by using at least a part of the still picture set values reflected in the motion picture for display (for example, the set value of the transfer target among the still picture set values).

Thereby, in the imaging and recording of the motion picture in a case where the motion picture shortcut button 102 is operated in a state where the still picture mode is set, the external memory 21 can be caused to store the same motion picture data as the motion picture for display displayed in the still picture mode.

Further, at least one of the still picture set value or the motion picture set value stored in the external memory 21 may be changed by an operation in a state where the motion picture for display is displayed on the display unit 23.

Modification Example 1

A configuration in which the external memory 21 is used as a storage unit that stores the still picture set value and the motion picture set value and a recording medium for imaging and recording has been described as an example, but the present invention is not limited to such a configuration. For example, the storage unit that stores the still picture set value and the motion picture set value and the recording medium for imaging and recording may be a built-in memory which is built in the digital camera 100. Further, the storage unit for storing the still picture set value and the motion picture set value and the recording medium for imaging and recording each may be constituted of separate memories.

Modification Example 2

A configuration in which the release button 101, the motion picture shortcut button 102, and the mode dial 103 are used as an example of the first operating part, the second operating part, and the third operating part has been described, but the configuration is not limited to such a configuration. For example, each of the first operating part, the second operating part, and the third operating part may be constituted of a touch sensor, a touch panel, or the like capable of performing a touch operation. For example, the display unit 23 is a display provided with a touch panel function, and can be implemented by operating each operating part displayed on the display by a touch operation or the like.

As described above, the present description discloses the following items.

(1)

There is provided an imaging apparatus comprising:

an imaging unit that is capable of performing imaging and recording;

a first operating part;

a second operating part;

a mode setting unit;

a storage unit that stores a still picture set value for imaging and recording of a still picture and a motion picture set value for imaging and recording of a motion picture; and a control unit that causes the imaging unit to execute imaging and recording of the still picture by using the still picture set value in a case where the first operating part is operated and causes the imaging unit to execute imaging and recording of the motion picture by using at least a part of the still picture set value in a case where the second operating part is operated, in a state where the mode setting unit is set to a first mode, and causes the imaging unit to execute imaging and recording of the motion picture by using the motion picture set value in a case where the first operating part or the second operating part is operated, in a state where the mode setting unit is set to a second mode.

(2)

In the imaging apparatus according to (1), the control unit causes the imaging unit to execute imaging and recording of the motion picture by using the motion picture set value in a case where the second operating part is operated in a state where the mode setting unit is set to the second mode.

(3)

In the imaging apparatus according to (1) or (2), the control unit causes the imaging unit to execute imaging and recording of the motion picture by using a set value of an item relating to visibility of a subject indicated by a recorded image among the still picture set values in a case where the second operating part is operated, in a state where the mode setting unit is set to the first mode.

(4)

In the imaging apparatus according to (3), the item relating to the visibility includes an item relating to exposure of imaging.

(5)

In the imaging apparatus according to (3) or (4), the item relating to the visibility includes an item relating to image processing of the recorded image.

(6)

In the imaging apparatus according to any one of (3) to (5), the item relating to the visibility includes an item relating to movement of the subject.

(7)

In the imaging apparatus according to any one of (3) to (6), the item relating to the visibility includes an item relating to a resolution of the recorded image.

(8)

In the imaging apparatus according to any one of (3) to (7), the control unit causes the imaging unit to execute imaging and recording of the motion picture by using the motion picture set value or a predetermined set value for at least a part of items other than the item relating to the visibility in a case where the second operating part is operated, in a state where the mode setting unit is set to the first mode.

(9)

In the imaging apparatus according to (8), the items other than the item relating to the visibility include an item relating to a focus mode.

(10)

In the imaging apparatus according to any one of (1) to (9), the control unit causes the imaging unit to execute imaging and recording of the motion picture by using at least a part of the still picture set value and at least a part of the motion picture set value in a case where the second operating part is operated, in a state where the mode setting unit is set to the first mode.

(11)

In the imaging apparatus according to any one of (1) to (10), at least a part of the still picture set value is a set value of an item included in both the still picture set value and the motion picture set value.

(12)

In the imaging apparatus according to any one of (1) to (11), the still picture set value and the motion picture set value are set values which are set by a user.

(13)

In the imaging apparatus according to any one of (1) to (12), there is provided a third operating part that performs switching between the first mode and the second mode in the control unit.

(14)

There is provided an imaging apparatus comprising:

an imaging unit that is capable of performing imaging and recording;

a first operating part;

a second operating part;

a mode setting unit;

a storage unit that stores a still picture set value for imaging and recording of a still picture and a motion picture set value for imaging and recording of a motion picture; and a control unit that causes the imaging unit to execute imaging and recording of the still picture by using the still picture set value in a case where the first operating part is operated and causes the imaging unit to execute imaging and recording of the motion picture by using at least a part of the still picture set value in which a motion picture for display is reflected in a case where the second operating part is operated, while outputting the motion picture for display by using at least a part of the still picture set value in a state where the mode setting unit is set to a first mode, and causes the imaging unit to execute imaging and recording of the motion picture by using the motion picture set value in a case where the first operating part or the second operating part is operated, while outputting a motion picture for display by using at least a part of the motion picture set value in a state where the mode setting unit is set to a second mode.

(15)

In the imaging apparatus according to (14), a user is able to change at least one of the still picture set value or the motion picture set value which is stored in the storage unit in a state where the motion picture for display is output.

(16)

In the imaging apparatus according to (14) or (15), there is further provided a display unit that displays the motion picture for display.

(17)

There is provided an imaging method executed by a control unit of an imaging apparatus, which includes an imaging unit that is capable of performing imaging and recording, a first operating part, a second operating part, a mode setting unit, and a storage unit that stores a still picture set value for imaging and recording of a still picture and a motion picture set value for imaging and recording of a motion picture, the method comprising:

causing the imaging unit to execute imaging and recording of the still picture by using the still picture set value in a case where the first operating part is operated and causing the imaging unit to execute imaging and recording of the motion picture by using at least a part of the still picture set value in a case where the second operating part is operated, in a state where the mode setting unit is set to a first mode; and causing the imaging unit to execute imaging and recording of the motion picture by using the motion picture set value in a case where the first operating part or the second operating part is operated, in a state where the mode setting unit is set to a second mode.

(18)

In the imaging method according to (17), the control unit causes the imaging unit to execute imaging and recording of the motion picture by using the motion picture set value in a case where the second operating part is operated in a state where the mode setting unit is set to the second mode.

(19)

In the imaging method according to (17) or (18), the control unit causes the imaging unit to execute imaging and recording of the motion picture by using a set value of an item relating to visibility of a subject indicated by a recorded image among the still picture set values in a case where the second operating part is operated, in a state where the mode setting unit is set to the first mode.

(20)

In the imaging method according to (19), the item relating to the visibility includes an item relating to exposure of imaging.

(21)

In the imaging method according to (19) or (20), the item relating to the visibility includes an item relating to image processing of the recorded image.

(22)

In the imaging method according to any one of (19) to (21), the item relating to the visibility includes an item relating to movement of the subject.

(23)

In the imaging method according to any one of (19) to (22), the item relating to the visibility includes an item relating to a resolution of the recorded image.

(24)

In the imaging method according to any one of (19) to (23), the control unit causes the imaging unit to execute imaging and recording of the motion picture by using the motion picture set value or a predetermined set value for at least a part of items other than the item relating to the visibility in a case where the second operating part is operated, in a state where the mode setting unit is set to the first mode.

(25)

In the imaging method according to (24), the items other than the item relating to the visibility include an item relating to a focus mode.

(26)

In the imaging method according to any one of (17) to (25), the control unit causes the imaging unit to execute imaging and recording of the motion picture by using at least a part of the still picture set value and at least a part of the motion picture set value in a case where the second operating part is operated, in a state where the mode setting unit is set to the first mode.

(27)

In the imaging method according to any one of (17) to (26), at least a part of the still picture set value is a set value of an item included in both the still picture set value and the motion picture set value.

(28)

In the imaging method according to any one of (17) to (27), the still picture set value and the motion picture set value are set values which are set by a user.

(29)

In the imaging method according to any one of (17) to (28), there is provided a third operating part that performs switching between the first mode and the second mode in the control unit.

(30)

There is provided an imaging method executed by a control unit of an imaging apparatus, which includes an imaging unit that is capable of performing imaging and recording, a first operating part, a second operating part, a mode setting unit, and a storage unit that stores a still picture set value for imaging and recording of a still picture and a motion picture set value for imaging and recording of a motion picture, the method comprising:

causing the imaging unit to execute imaging and recording of the still picture by using the still picture set value in a case where the first operating part is operated and causing the imaging unit to execute imaging and recording of the motion picture by using at least a part of the still picture set value in which a motion picture for display is reflected in a case where the second operating part is operated, while outputting the motion picture for display by using at least a part of the still picture set value in a state where the mode setting unit is set to a first mode; and causing the imaging unit to execute imaging and recording of the motion picture by using the motion picture set value in a case where the first operating part or the second operating part is operated, while outputting a motion picture for display by using at least a part of the motion picture set value in a state where the mode setting unit is set to a second mode.

(31)

In the imaging method according to (30), a user is able to change at least one of the still picture set value or the motion picture set value which is stored in the storage unit in a state where the motion picture for display is output.

(32)

In the imaging method according to (30) or (31), the imaging apparatus includes a display unit that displays the motion picture for display.

(33)

There is provided an imaging program of causing a processor of an imaging apparatus, which includes an imaging unit that is capable of performing imaging and recording, a first operating part, a second operating part, a mode setting unit, and a storage unit that stores a still picture set value for imaging and recording of a still picture and a motion picture set value for imaging and recording of a motion picture, to execute processing of:

causing the imaging unit to execute imaging and recording of the still picture by using the still picture set value in a case where the first operating part is operated and causing the imaging unit to execute imaging and recording of the motion picture by using at least a part of the still picture set value in a case where the second operating part is operated, in a state where the mode setting unit is set to a first mode; and causing the imaging unit to execute imaging and recording of the motion picture by using the motion picture set value in a case where the first operating part or the second operating part is operated, in a state where the mode setting unit is set to a second mode.

(34)

There is provided an imaging program of causing a control unit of an imaging apparatus, which includes an imaging unit that is capable of performing imaging and recording, a first operating part, a second operating part, a mode setting unit, and a storage unit that stores a still picture set value for imaging and recording of a still picture and a motion picture set value for imaging and recording of a motion picture, to execute processing of:

causing the imaging unit to execute imaging and recording of the still picture by using the still picture set value in a case where the first operating part is operated and causing the imaging unit to execute imaging and recording of the motion picture by using at least a part of the still picture set value in which a motion picture for display is reflected in a case where the second operating part is operated, while outputting the motion picture for display by using at least a part of the still picture set value in a state where the mode setting unit is set to a first mode; and causing the imaging unit to execute imaging and recording of the motion picture by using the motion picture set value in a case where the first operating part or the second operating part is operated, while outputting a motion picture for display by using at least a part of the motion picture set value in a state where the mode setting unit is set to a second mode.

Although various embodiments have been described above with reference to the drawings, it is needless to say that the present invention is not limited to such examples. It is apparent to those skilled in the art that various variations or modifications can be made within the scope of the claims, and it should be understood that such variations or modifications belong to the technical scope of the invention. Further, each constituent element in the above-mentioned embodiment may be arbitrarily combined without departing from the spirit of the invention.

This application is on the basis of a Japanese patent application filed on Aug. 28, 2020 (JP2020-144982), the contents of which are incorporated herein by reference.

EXPLANATION OF REFERENCES

11: system control unit
14: operating part
15: memory control unit
16: main memory
17: digital signal processing unit
20: external memory control unit
21: external memory
22: display control unit
23: display unit
24: system bus
25: data bus
40: lens device
41: imaging lens
43: lens driving unit
44: stop driving unit
45: lens control unit
46: action table
50: imaging unit
51: imaging element unit
52: circuit board
61: still picture setting information
62: motion picture setting information
100: digital camera
101: release button
102: motion picture shortcut button
103: mode dial
105: lens mount

What is claimed is:

1. An imaging apparatus comprising:
an imaging unit that is capable of performing imaging and recording;
a first operating part;
a second operating part;
a mode setting unit;
a storage unit that stores a still picture set value for imaging and recording of a still picture and a motion picture set value for imaging and recording of a motion picture; and
a control unit that causes the imaging unit to capture the still picture by using the still picture set value in a case where the first operating part is operated and causes the imaging unit to execute imaging and recording of the motion picture by using at least a part of the still picture set value for a predetermined item in a case where the second operating part is operated, in a state where the mode setting unit is set to a still picture capturing mode, and causes the imaging unit to execute imaging and recording of the motion picture by using the motion picture set value for the predetermined item in a case where the second operating part is operated, in a state where the mode setting unit is set to a motion picture capturing mode.

2. The imaging apparatus according to claim 1, wherein the control unit causes the imaging unit to execute imaging and recording of the motion picture by using a set value of an item relating to visibility of a subject indicated by a recorded image among the still picture set values in a case where the second operating part is operated, in a state where the mode setting unit is set to the still picture capturing mode.

3. The imaging apparatus according to claim 2, wherein the item relating to the visibility includes an item relating to exposure of imaging.

4. The imaging apparatus according to claim 2, wherein the item relating to the visibility includes an item relating to image processing of the recorded image.

5. The imaging apparatus according to claim 2, wherein the item relating to the visibility includes an item relating to movement of the subject.

6. The imaging apparatus according to claim 2,
wherein the item relating to the visibility includes an item relating to a resolution of the recorded image.

7. The imaging apparatus according to claim 2,
wherein the control unit causes the imaging unit to execute imaging and recording of the motion picture by using the motion picture set value or a predetermined set value for at least a part of items other than the item relating to the visibility in a case where the second operating part is operated, in a state where the mode setting unit is set to the still picture capturing mode.

8. The imaging apparatus according to claim 7,
wherein the items other than the item relating to the visibility include an item relating to a focus mode.

9. The imaging apparatus according to claim 1,
wherein the control unit causes the imaging unit to execute imaging and recording of the motion picture by using at least a part of the still picture set value and at least a part of the motion picture set value in a case where the second operating part is operated, in a state where the mode setting unit is set to the still picture capturing mode.

10. The imaging apparatus according to claim 1,
wherein at least a part of the still picture set value is a set value of an item included in both of the still picture set value and the motion picture set value.

11. The imaging apparatus according to claim 1,
wherein the still picture set value and the motion picture set value are set values which are set by a user.

12. The imaging apparatus according to claim 1,
further comprising a third operating part that performs switching between the still picture capturing mode and the motion picture capturing mode in the control unit.

13. An imaging apparatus comprising:
an imaging unit that is capable of performing imaging and recording;
a first operating part;
a second operating part;
a mode setting unit;
a storage unit that stores a still picture set value for imaging and recording of a still picture and a motion picture set value for imaging and recording of a motion picture; and
a control unit that causes the imaging unit to capture the still picture by using the still picture set value for a predetermined item in a case where the first operating part is operated and causes the imaging unit to execute imaging and recording of the motion picture by using at least a part of the still picture set value, in which a motion picture for display is reflected, for the predetermined item in a case where the second operating part is operated, while outputting the motion picture for display by using at least a part of the still picture set value for the predetermined item in a state where the mode setting unit is set to a still picture capturing mode, and causes the imaging unit to execute imaging and recording of the motion picture by using the motion picture set value for the predetermined item in a case where the second operating part is operated, while outputting a motion picture for display by using at least a part of the motion picture set value for the predetermined item in a state where the mode setting unit is set to a motion picture capturing mode.

14. The imaging apparatus according to claim 13,
wherein at least one of the still picture set value or the motion picture set value which is stored in the storage unit is changeable by a user in a state where the motion picture for display is output.

15. The imaging apparatus according to claim 13, further comprising a display that displays the motion picture for display.

16. An imaging method executed by a control unit of an imaging apparatus which includes an imaging unit that is capable of performing imaging and recording, a first operating part, a second operating part, a mode setting unit, and a storage unit that stores a still picture set value for imaging and recording of a still picture and a motion picture set value for imaging and recording of a motion picture, the method comprising:
causing the imaging unit to capture the still picture by using the still picture set value in a case where the first operating part is operated and causing the imaging unit to execute imaging and recording of the motion picture by using at least a part of the still picture set value for a predetermined item in a case where the second operating part is operated, in a state where the mode setting unit is set to a still picture capturing mode; and
causing the imaging unit to execute imaging and recording of the motion picture by using the motion picture set value for the predetermined item in a case where the second operating part is operated, in a state where the mode setting unit is set to a motion picture capturing mode.

17. An imaging method executed by a control unit of an imaging apparatus which includes an imaging unit that is capable of performing imaging and recording, a first operating part, a second operating part, a mode setting unit, and a storage unit that stores a still picture set value for imaging and recording of a still picture and a motion picture set value for imaging and recording of a motion picture, the method comprising:
causing the imaging unit to capture the still picture by using the still picture set for a predetermined item value in a case where the first operating part is operated and causing the imaging unit to execute imaging and recording of the motion picture by using at least a part of the still picture set value, in which a motion picture for display is reflected, for the predetermined item in a case where the second operating part is operated, while outputting the motion picture for display by using at least a part of the still picture set value for the predetermined item in a state where the mode setting unit is set to a still picture capturing mode; and
causing the imaging unit to execute imaging and recording of the motion picture by using the motion picture set value for the predetermined item in a case where the second operating part is operated, while outputting a motion picture for display by using at least a part of the motion picture set value for the predetermined item in a state where the mode setting unit is set to a motion picture capturing mode.

* * * * *